Figure 1:
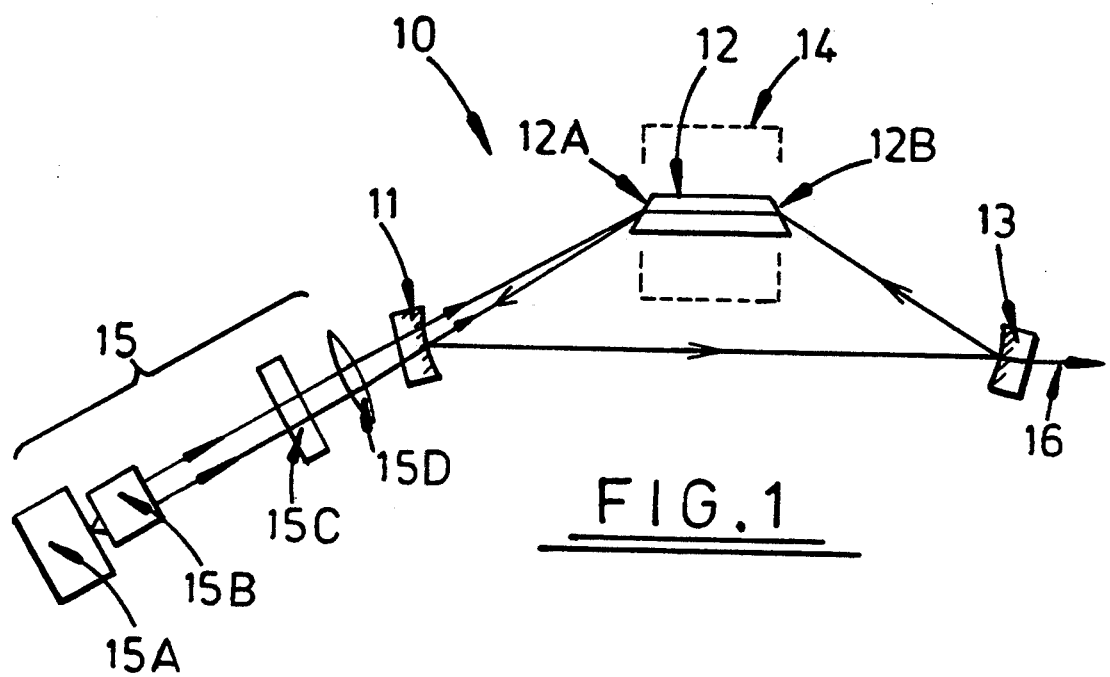

United States Patent [19]
Maker

[11] Patent Number: 5,357,537
[45] Date of Patent: Oct. 18, 1994

[54] RING LASER

[75] Inventor: Gareth T. Maker, Glasgow, Scotland

[73] Assignee: University of Strathclyde, Glasgow, Scotland

[21] Appl. No.: 119,350

[22] Filed: Sep. 9, 1993

[30] Foreign Application Priority Data

Sep. 9, 1992 [GB] United Kingdom ............ 9219095.8

[51] Int. Cl.$^5$ .............................................. H01S 3/083
[52] U.S. Cl. .......................................... 372/94; 372/37
[58] Field of Search ................................... 372/37, 94

[56]  References Cited

U.S. PATENT DOCUMENTS

| | | | |
|---|---|---|---|
| 3,639,855 | 2/1972 | Dillon et al. | 372/37 |
| 3,824,492 | 7/1974 | Brienza et al. | 372/37 |
| 4,122,412 | 10/1978 | Hughes | 372/37 |
| 4,747,111 | 5/1988 | Trutna et al. | 372/37 |
| 4,941,147 | 7/1990 | Bhowmik | 372/37 |
| 4,955,034 | 9/1990 | Scerbak | 372/94 |
| 5,027,367 | 6/1991 | Rea et al. | 372/37 |
| 5,052,815 | 10/1991 | Nightingale et al. | 372/94 |
| 5,148,444 | 9/1992 | Berger | 372/37 |
| 5,222,094 | 6/1993 | Hanna et al. | 372/94 |

FOREIGN PATENT DOCUMENTS

| | | |
|---|---|---|
| 452069 | 10/1991 | European Pat. Off. . |
| 2143337 | 4/1984 | United Kingdom . |
| 9012435 | 10/1990 | World Int. Prop. O. . |

*Primary Examiner*—Rodney B. Bovernick
*Assistant Examiner*—Robert E. Wise
*Attorney, Agent, or Firm*—Bell Seltzer Park

[57] ABSTRACT

A ring laser has a cavity formed by only three elements. The first element is a concave mirror (11) which is wholly reflective to the cavity radiation but is transmissive to pump wavelength radiation. The third element is a concave mirror (13) which provides the output from the cavity. The second element is a gain element in the form of a rod (12) located in a constant axially-aligned magnetic field from a permanent magnet (14). The end faces (12A,12B) of the rod (12) are Brewster angled and additionally one such face (12B) is tilted or wedged by up to 5° to make the cavity non-planar. The rod (12) is made of a material exhibiting the Faraday effect.

6 Claims, 1 Drawing Sheet

RING LASER

This invention relates to a ring laser.

Ring lasers are already known for producing unidirectional operation to achieve single longitudinal mode operation with an output beam at a single frequency. Some designs are pumped using a laser diode to enable the entire laser to be solid state which provides the advantage of a compact design and a short cavity length which simplifies achievement of single longitudinal mode operation. However, all ring lasers of this known type require the introduction of intra-cavity components to increase the round trip loss for unwanted longitudinal modes. These designs have the disadvantage of being sensitive to alignment of the intra-cavity components and are comparatively expensive to produce.

It is an object of the present invention to provide a new and improved form of ring laser capable of single longitudinal mode operation with an output beam at a single frequency.

According to the present invention a ring laser comprises a laser cavity formed by three elements which are mutually spaced apart, the first element being a concave mirror which is substantially wholly reflective to the radiation in the cavity but transmissive to pump wavelength radiation, the second element being a rod of a suitable gain medium, the ends of the rod being mutually inclined and each end of the rod being inclined to the rod axis essentially at Brewster's angle, and the third element being a concave mirror adapted to provide an output beam from the cavity, the arrangement being such that one Brewster angled face of the rod is also inclined at a wedge angle to the longitudinal axis of the rod to cause the cavity to be non-planar, and the gain medium is selected to exhibit the Faraday effect and is enveloped in a constant strength magnetic field aligned with the axis of the rod.

The wedged Brewster angled face on the rod may be proximal to the first concave mirror or to the second concave mirror. The magnetic field may be aligned in either direction along the axis of the rod. The lasing mode may circulate either clockwise or anticlockwise around the cavity.

Preferably the rod is made of neodymium yag having a cylindrical cross-section and the magnetic field is provided by a permanent magnetic material surrounding the gain medium rod.

Preferably the wedged Brewster angled face on the rod is tilted at a wedge angle of less than 5° and can be wedged up or wedged down.

Preferably the input and output mirrors are disposed to provide astigmatic compensation to the cavity.

Conveniently the input mirror is designed for use with a laser diode pump.

By virtue of the present invention the laser cavity is particularly simple in that it comprises only three elements which are comparatively easy to manufacture and to align. Furthermore, because the elements are spaced in air it is possible to accommodate a Q switch or the like in the cavity in order to achieve specialised laser operation.

It will be understood that the provision of Brewster angled faces on the rod restricts the light circulating around the cavity to being horizontally plane polarised. The Faraday effect imposes a non-reciprocal rotation on the polarisation plane of the circulating light which in combination with the reciprocal rotation imposed by the wedged condition of the wedged Brewster face gives rise to a loss difference between the counter propagating beams sufficient to cause the cavity to suppress propagation of the beam experiencing the greater loss. Thus the laser operates in single longitudinal mode with an output beam at a single frequency. By selecting the magnitude of the Faraday effect to rotate the polarisation plane of the circulating light by the same amount as that arising due to the wedged condition of the wedged face of the rod the circulating beam effectively experiences no loss and maximum power output is achieved from the laser.

Figure 2:
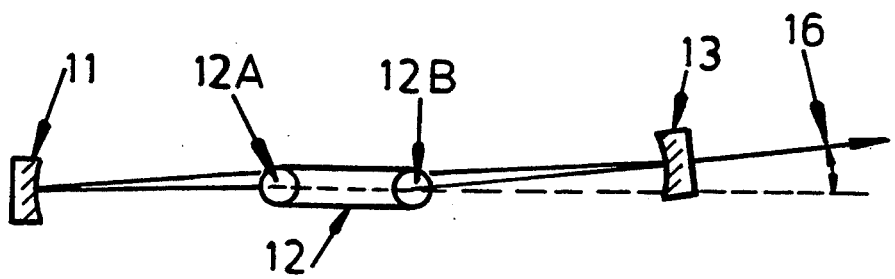

An embodiment of the present invention will now be described by way of example with reference to the accompanying drawing in which, FIG. 1 is a plan view of a laser in accordance with the present invention, and FIG. 2 is a side elevational view of part of FIG. 1 with the various angles shown in exaggerated fashion in the interests of clarity.

The laser 10 as shown in FIG. 1 comprises a cavity which is formed by three elements. These elements are an input coupler mirror 11, a gain medium in rod like form 12 and an output coupler mirror 13. The rod 12 is disposed in an axially magnetised permanent magnet 14 and the input mirror 11 is arranged to be highly reflective to cavity radiation but transmissive to pump radiation provided by a pump arrangement 15. Output mirror 13 is about 95% reflective to the cavity radiation and the remaining radiation is transmitted to form the output beam 16 from the laser 10.

Pump arrangement 15 comprises a laser diode 15A, a collimating lens 15B, a cylindrical lens 15C and a spherical lens 15D and delivers pump radiation from the diode 15A through input mirror 11 to focus on end face 12A of rod 12. Face 12A is precisely angled at Brewsters angle to the longitudinal axis of the rod and is free of coatings. The other end face 12B of rod 12 is also essentially inclined at Brewsters angle, is free of coatings, and is inclined to end face 12A, but additionally is also wedged up at a wedge angle which is less than 5° and preferably is in the range of 1° to 2° in order to take the laser cavity out of a single plane. This wedging of face 12B is about an axis lying in the plane of face 12B and in the view shown in FIG. 2 co-incident with the longitudinal axis of the rod 12. The non-planar nature of the cavity is shown more clearly in FIG. 2 from which it will also be seen that output mirror 13 is correspondingly tilted with respect to the rod 12 and input mirror 11. Additionally, the mirror faces of mirrors 11 and 13 are concave and arranged to provide for astigmatic compensation to the cavity.

In a specific example the laser diode 15A is a 1 W SDL-2462-P1 diode laser operating at a wavelength of 807 nm. Its output is collimated in the plane perpendicular to the diode junction using a 6.5 mm focal length Melles Criot lens 15B. Lens 15C is a 10 cm focal length cylindrical lens used to collimate the output in the perpendicular plane and spherical lens 15D is of a suitable focal length (25 mm) for focussing the resultant beam through the mirror 11 onto the end face 12A of the rod 12. Mirror 11 has a 7.5 cm radius of curvature and is polished and coated to be highly reflecting (greater than 99.5%) at the lasing wavelength of 1064 nm and highly transmitting (greater than 85%) at the pump wavelength of 807 nm. The separation between mirrors 11 and 13 is 4 cm and mirror 13 also has a 7.5 cm radius of curvature and is polished and coated to be 5% transmitting and 95% reflecting at the lasing wavelength of 1064 nm. The angle of incidence of the oscillating light at the mirrors 11 and 13 is nominally 16° but to compensate for astigmatism is preferably reduced to 14°. Rod 12 is 1% doped Nd:YAC and is 10 mm long, measured along its central axis. The lasing mode spot size within the rod 12 is about 100 microns by 180 microns (the elipticity being caused by the Brewster angles) and the pump beam spot is fitted within this profile.

Magnet 14 is made of sintered neodymium cobalt with a magnetic remanence of 12 KG, being a cylindrical body of 14 mm outside diameter, 5.5 mm inside diameter and length 10 mm. This magnet produces an integrated field strength of 29 kG mm along the rod length. The Verdet constant of Nd:YAG is $1.8 \times 10^{-7}$ rad $G^{-1}$ mm$^{-1}$ which gives rise to a rotation angle in the horizontally linearly polarised light within the rod of 0.3°. The wedge angle on face 12B is 1.5° which causes an out of plane rotation of about 0.33°. The differential loss between the counter rotating lasing beams is about 0.01%.

With the system in operation the pump diode 15A produces about 770 mW incident on rod face 12A which gives rise to a single frequency output power of about 200 mW at the lasing wavelength of 1064 nm.

It will now be appreciated that the laser which has been described is particularly easy to manufacture in that the rod 12 has no coatings on its end faces which are simply polished to the required quality at Brewsters angle. The only dielectric coatings used in the laser are on the mirrors 11,13 and these are known coatings. The gain medium may be any suitable Faraday-effect exhibiting medium including Nd:YLF and Ti:Sapphire and the pump beam may be generated by any suitable pump source.

I claim:

1. A ring laser comprises a laser cavity formed by three elements which are mutually spaced apart, the first element being a concave mirror which is substantially wholly reflective to the radiation in the cavity but transmissive to pump wavelength radiation, the second element being a rod of a suitable gain medium, the ends of the rod being mutually inclined and each end of the rod being inclined to the rod axis essentially at Brewster's angle, and the third element being a concave mirror adapted to provide an output beam from the cavity, the arrangement being such that one Brewster angled face of the rod is also inclined at a wedge angle to the longitudinal axis of the rod to cause the cavity to be non-planar, and the gain medium is selected to exhibit the Faraday effect and is enveloped in a constant strength magnetic field aligned with the axis of the rod.

2. A ring laser as claimed in claim 1, wherein the wedge angle of the wedged Brewster-angled face is less than 5°.

3. A ring laser as claimed in claim 2 wherein the wedge angle of the wedged Brewster-angled face is in the range of 1° to 2°.

4. A ring laser as claimed in claim 1, wherein the wedged Brewester-angled face on the rod is proximal to the third element.

5. A ring laser as claimed in claim 1, wherein the gain medium is neodymium yag.

6. A ring laser as claimed in claim 1, wherein the only optical coatings in the cavity are on the concave mirrors.

* * * * *